US009148436B2

(12) United States Patent
Yuasa et al.

(10) Patent No.: US 9,148,436 B2
(45) Date of Patent: Sep. 29, 2015

(54) INFORMATION PROCESSING DEVICE, COMPUTER READABLE MEDIUM, AND INFORMATION PROCESSING SYSTEM

(71) Applicant: PFU Limited, Kahoku-shi, Ishikawa (JP)

(72) Inventors: Tomonori Yuasa, Kahoku (JP); Yasuharu Inami, Kahoku (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/170,390

(22) Filed: Jan. 31, 2014

(65) Prior Publication Data
US 2014/0230022 A1    Aug. 14, 2014

(30) Foreign Application Priority Data

Feb. 8, 2013    (JP) .................................. 2013-023312

(51) Int. Cl.
H04L 29/06    (2006.01)
(52) U.S. Cl.
CPC ......... H04L 63/107 (2013.01); *H04L 2463/082* (2013.01)
(58) Field of Classification Search
USPC .................................................... 726/3, 4, 7
See application file for complete search history.

(56) References Cited

U.S. PATENT DOCUMENTS

| | | | | |
|---|---|---|---|---|
| 7,428,411 | B2 * | 9/2008 | Zellner | 455/419 |
| 2007/0136573 | A1 * | 6/2007 | Steinberg | 713/155 |
| 2010/0188421 | A1 | 7/2010 | Ohwa et al. | |
| 2011/0296513 | A1 * | 12/2011 | Kasad | 726/9 |
| 2014/0068717 | A1 * | 3/2014 | Mayes et al. | 726/3 |
| 2014/0157381 | A1 * | 6/2014 | Disraeli | 726/7 |

FOREIGN PATENT DOCUMENTS

| | | |
|---|---|---|
| JP | 2008-047022 A | 2/2008 |
| JP | 2010-114727 A | 5/2010 |
| JP | 2010-176249 A | 8/2010 |

OTHER PUBLICATIONS

"Preventing Information Leakage from Indexing in the Cloud"; Squicciarini et al; 2010 IEEE 3rd International Conference on Cloud Computing; p. 188-195.*

* cited by examiner

Primary Examiner — Jason Lee
(74) Attorney, Agent, or Firm — McDermott Will & Emery LLP

(57) ABSTRACT

There is provided an information processing device having: a request acceptance portion that accepts a content access request from a mobile terminal; a location identification portion that identifies a location where the mobile terminal exists; a template identification portion that identifies a template configured to be accessed by the mobile terminal; and an authentication portion that decides whether to allow the accepted content access request based on the identified location, the identified template, and a time zone in which the access request from the mobile terminal is accepted.

11 Claims, 20 Drawing Sheets

FIG. 2
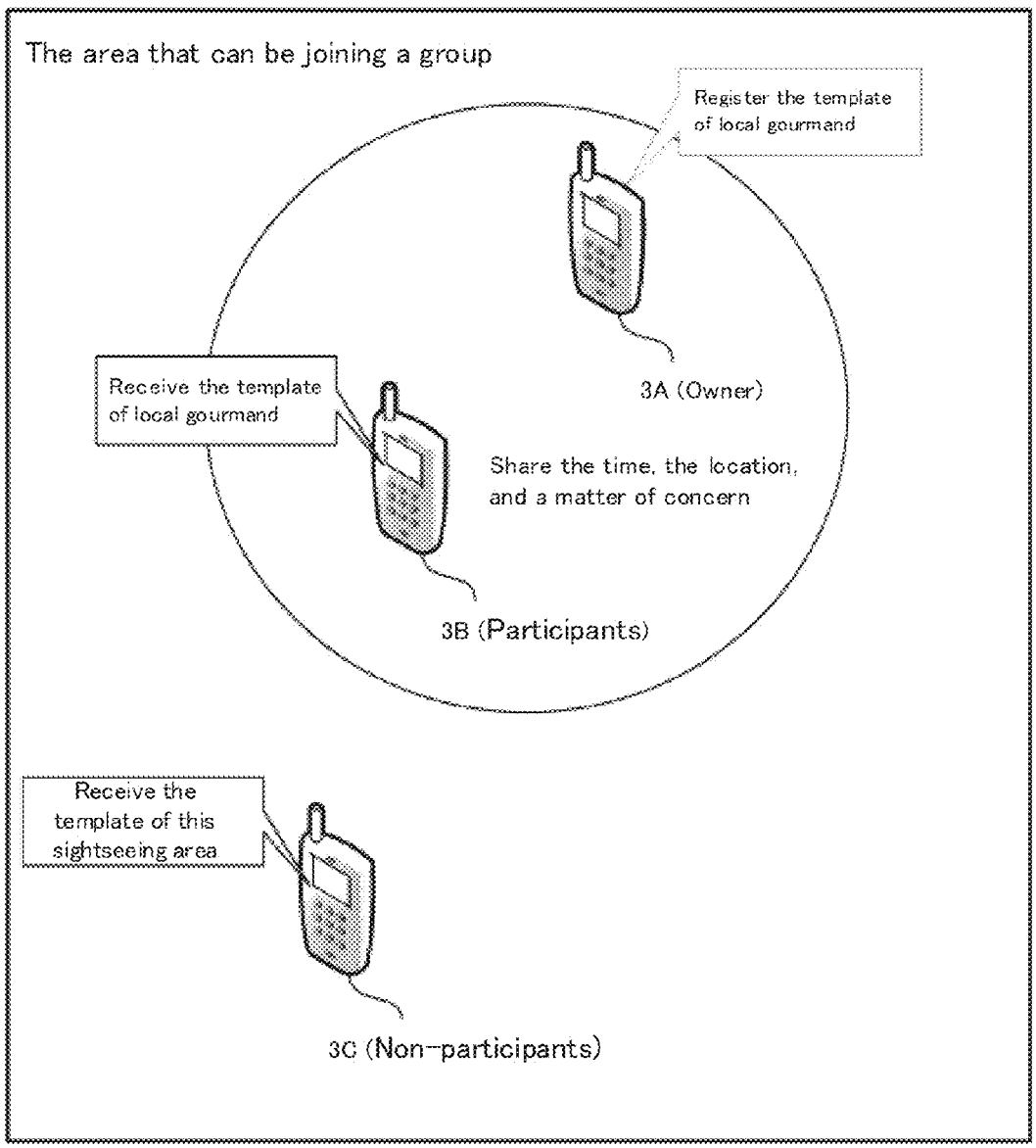
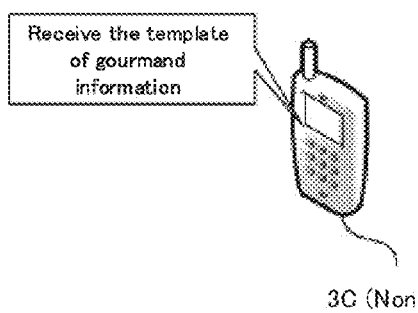

Shared spot server 4

FIG. 7A

| Group ID | Owner | Set information |
|---|---|---|
| AAAA | BBBB | CCCC.txt |
| ... | ... | ... |

(A) Set information database 600

FIG. 7B

| Group ID | Content |
|---|---|
| AAAA | Template A |
| | Character string A |
| | Picture A |
| | ... |
| ... | ... |

(B) Content database 610

FIG. 7C

| Group ID | Participant |
|---|---|
| AAAA | XXXX |
| | YYYY |
| ... | ... |

(C) Group database 620

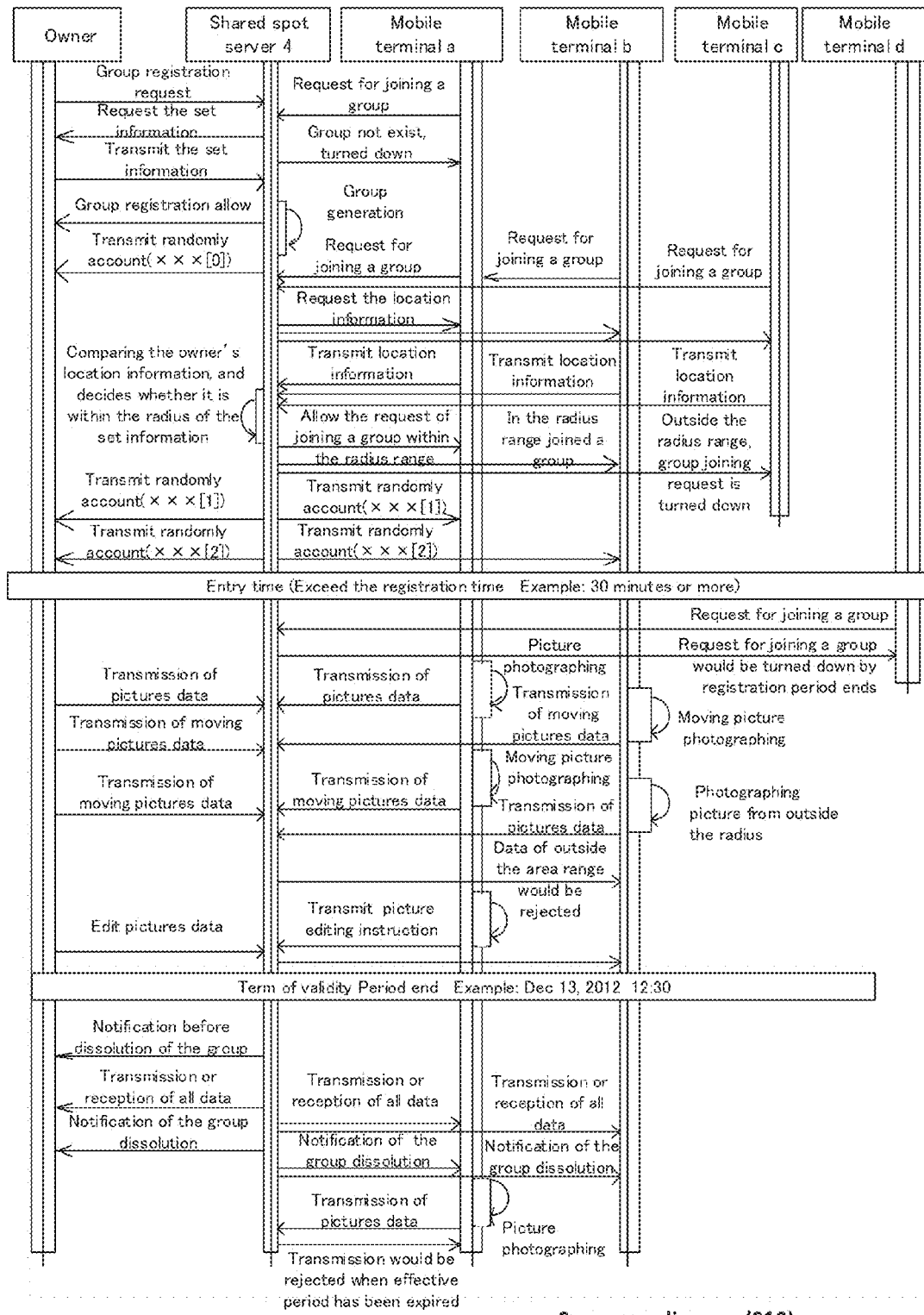

FIG. 9

```
[Group Manifest]
    Location:        Japan         (1041)
                     N 072° 46'20.55"
                     E 013° 02' 42.41"

Effective Radius:        25.0[m]

Entry Time      :        2012-12-13T09:00:00
                             2012-12-13T09:30:00

Term of Validity:        2012-12-13T10:00:00
                             2012-12-13T12:30:00

Imprint Theme Sheet      [Theme-name]

Maximum User:            20[member]
    User Sharing:            Disable
    Allow Out of Area:       Disable
    Allow After Sharing:     Disable
    Auto Connecting:         Enable
    Require Password:        Disable
```

Set information 900

Group generation processing (S20)

Content editing/distribution processing (S30)

FIG. 14A

| Closely Resembles | Period and area is same, and agrees with the template by at least 95% |
|---|---|
| Resembles | Period and area are included, and agrees with the template by at least 95% |

(A) Similarity decision conditions

FIG. 14B

| Group ID | Parent group ID | Participant |
|---|---|---|
| AAAA | NULL | XXXX |
| | | YYYY |
| BBBB | AAAA | ZZZZ |
| | | .... |
| .... | .... | .... |

(B) Group database 620

Set information registration processing (S50)

FIG. 16
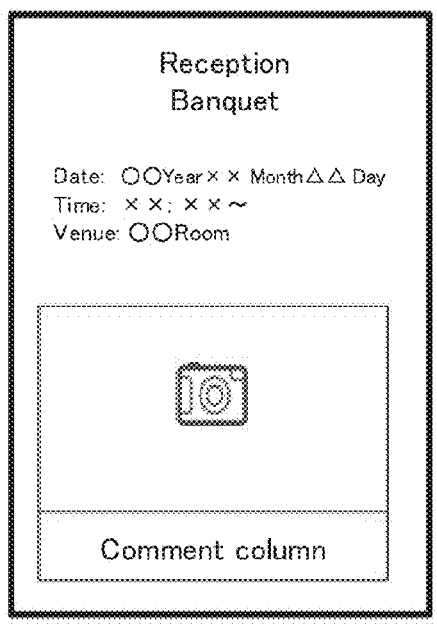
Example of parent template
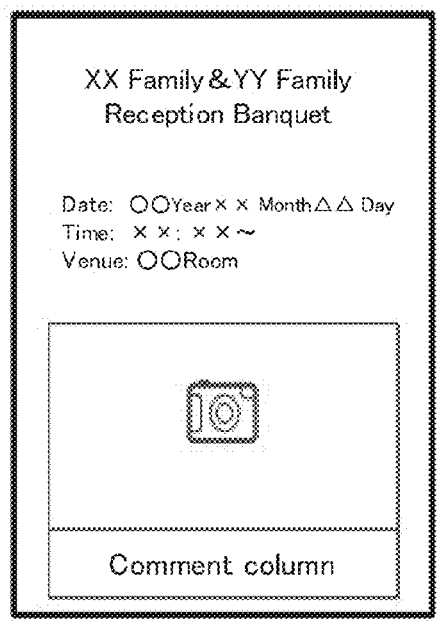
Example 1 of child template
(Handover-exclusive)
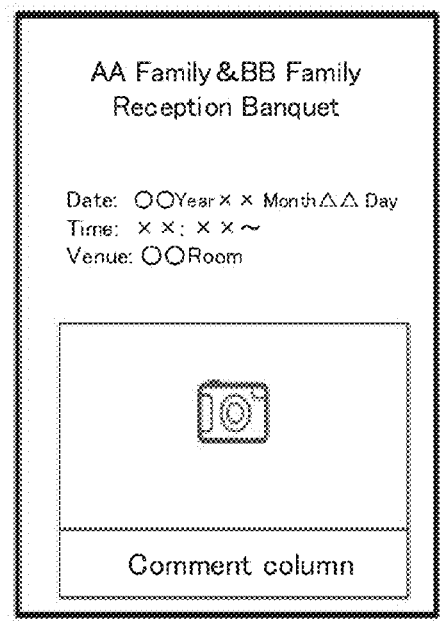
Example 2 of child template
(Completion of the password setting)

FIG. 17
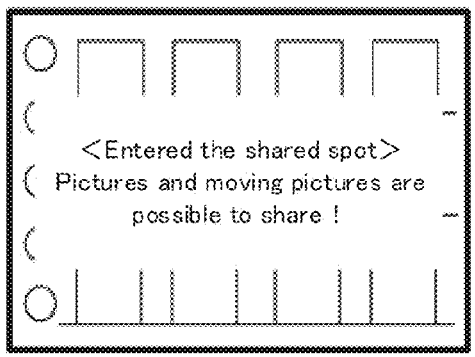
(A) The display screen for when mobile terminals joined the shared spot
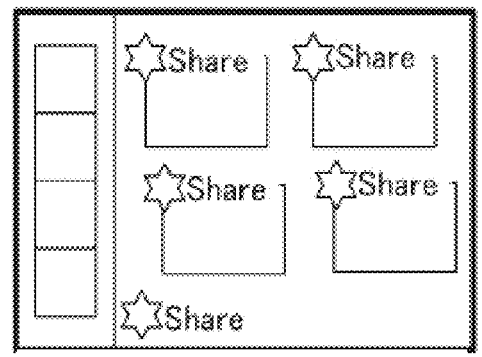
(B) The display screen of shared content
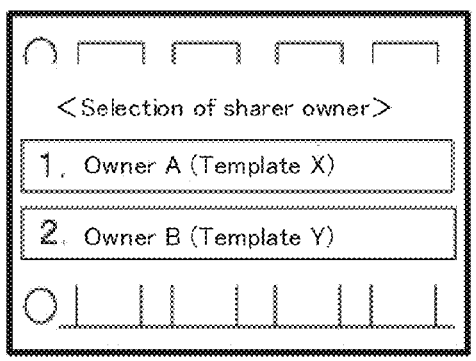
(C) The display screen of the template list when more than one owner exist
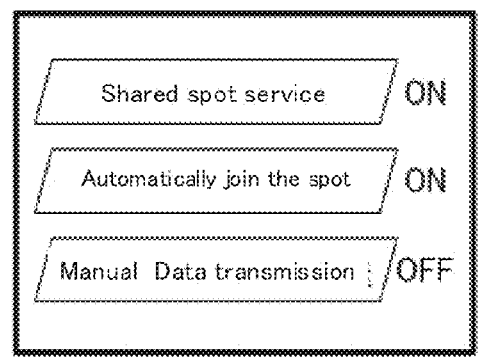
(D) Set screen
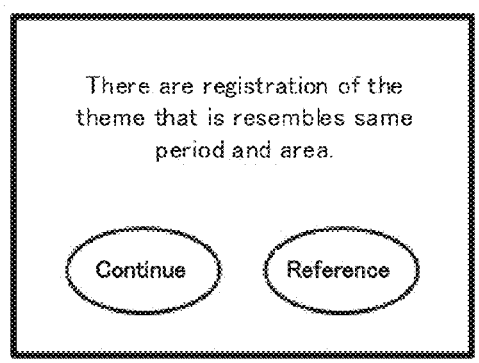
(E) The display screen for when resemblance group existed

INFORMATION PROCESSING DEVICE, COMPUTER READABLE MEDIUM, AND INFORMATION PROCESSING SYSTEM

CROSS-REFERENCE TO RELATED APPLICATIONS

This application is based on and claims priority under 35 USC 119 from Japanese Patent Application No. 2013-023312 filed Feb. 8, 2013.

FIELD

The invention relates to an information processing device, an information processing system, and a computer readable medium.

BACKGROUND

Japanese Patent Application Laid-Open (JP-A) No. 2010-176249 discloses an information processing device having a storage portion configured to store a plurality of templates having different designs configured to be applied to expand a content containing a document or an image in the template having a predetermined design in a template and display it, along with template attribute information, and a control portion configured to perform matching processing on the template attribute information by using configuration information of the content as a research key to select the template having the template attribute information with a high matching rate as a content-compatible template configured to be applied in content display.

Japanese Patent Application Laid-Open (JP-A) No. 2008-47022 discloses an information sharing system including a plurality of mobile terminal devices connected to a network each of which is configured to acquire user information related to users of the other mobile terminal devices from a server device connected to the network, in which the mobile terminal device includes a first terminal registration portion configured to requests the server device to register its own identification information, a first shared information registration portion configured to request the server device to register its own user information, a first pairing registration portion configured to request sharing the registered user information with any other mobile terminal device whose identification information is registered in the server device, and a first shared information reference portion configured to request the server device to reference the user information of the mobile terminal device whose registered user information is permitted to be shared; and the server device includes a second terminal registration portion configured to register the mobile terminal device based on a registration request by the first terminal registration portion, a second shared information registration portion configured to register the user information based on a registration request by the first shared information registration portion, a second pairing registration portion configured to permit sharing of the user information based on a registration request by the first pairing registration portion, and a second shared information reference portion configured to accept to reference the user information based on a reference request by the first shared information reference portion.

Japanese Patent Application Laid-Open (JP-A) No. 2010-114727 discloses a pairing device configured to pair terminals, the pairing device including an identification information update section configured to update a combination of identification information every predetermined period, an identification information storage section configured to store the combination of the identification information updated by the identification information update section, an identification information transmission section configured to, if a pairing request for pairing of the terminals is received, extract the combination of the identification information stored in the identification information storage section at a point in time of the reception of the pairing request and transmit it to the terminal that has received the pairing request, an identification information reception section configured to receive from each of the terminals the identification selected from among a plurality of the identification information pieces contained in the combination of the identification information, and a pairing decision section configured to decide that the terminals are to be paired whose identification information pieces received from the identification information reception section match each other.

SUMMARY

According to an aspect of the invention, there is provided an information processing device having: a request acceptance portion that accepts a content access request from a mobile terminal; a location identification portion that identifies a location where the mobile terminal exists; a template identification portion that identifies a template configured to be accessed by the mobile terminal; and an authentication portion that decides whether to allow the accepted content access request based on the identified location, the identified template, and a time zone in which the access request from the mobile terminal is accepted.

According to another aspect of the invention, there is provided a non-transitory computer-readable medium storing thereon a computer program that causes a computer to perform a method comprising: accepting a content access request from a mobile terminal; identifying a location where the mobile terminal exists; identifying a template configured to be accessed by the mobile terminal; and deciding whether to allow the accepted content access request based on the identified location, the identified template, and a time zone in which the content access request from the mobile terminal is accepted.

According to another aspect of the invention, there is provided an information processing system having a mobile terminal and an information processing device, wherein: the information processing device includes: a request acceptance portion that accepts a content access request from the mobile terminal; a location identification portion that identifies a location where the mobile terminal exists; a template identification portion that identifies a template configured to be accessed by the mobile terminal; and an authentication portion that decides whether to allow the accepted content access request based on the identified location, the identified template, and a time zone in which the content access request from the mobile terminal is accepted; and the mobile terminal edits contents by using the template.

BRIEF DESCRIPTION OF THE DRAWINGS

Exemplary embodiments of the present invention will be described in detail based on the following figures.

FIG. 2 is an explanatory view of group joining conditions (authentication conditions) in the shared spot system 1;

FIGS. 7A, 7B and 7C are tables illustrating data managed by the shared spot server 4;

FIG. 8 is a sequence diagram illustrating an outline of operations (S10) in the shared spot system 1;

FIG. 9 is a table illustrating set information 900;

FIG. 14A is a table illustrating Degree of similarity decision conditions;

FIG. 14B is a table illustrating Group database 620;

FIG. 16 is a view illustrating a template in the second embodiment; and

FIG. 17 is a view illustrating a display screen to be displayed on the mobile terminal 3.

DESCRIPTION OF EMBODIMENTS

The following will describe a first embodiment of the invention with reference to the drawings.

Figure 1:
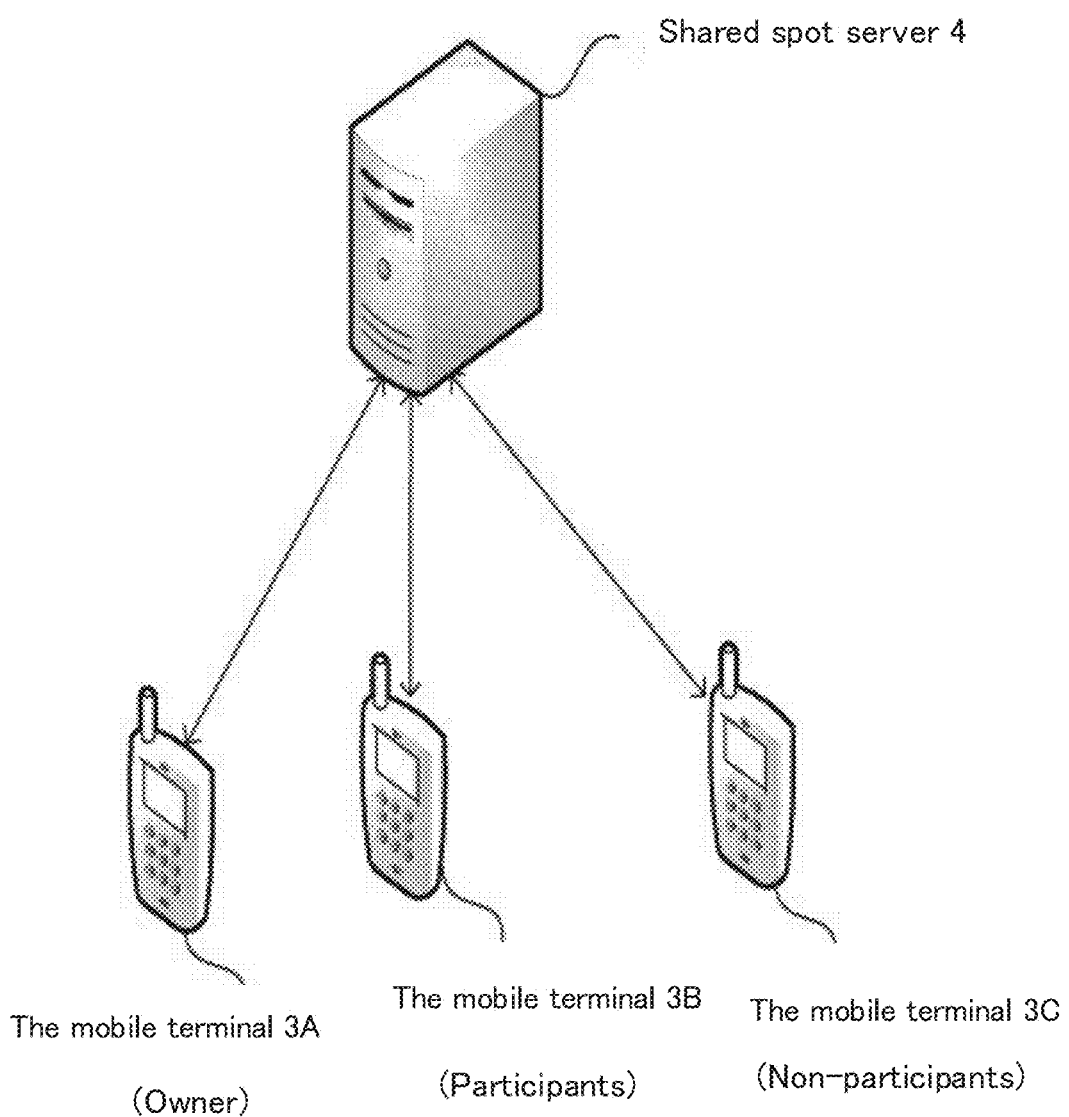
FIG. 1 is a view illustrating a hardware configuration of a shared spot system 1.

FIG. 1 is a view illustrating the hardware configuration of a shared spot system 1.

As illustrated in FIG. 1, a shared spot system 1 includes a mobile terminal 3 and a shared spot server 4.

The mobile terminal 3 is a mobile type computer terminal configured to be operated by a user in charge of co-editing. The present example will be described specifically in a mode in which there are the user (owner) who leads a group in co-editing and other users (participants) who join the group, each of which users owns the mobile terminal 3. The user who does not join the group is referred to as a non-participant.

FIG. 2 is an explanatory view of group joining conditions (authentication conditions) in the shared spot system 1.

As illustrated in FIG. 2, the shared spot server 4 decides whether a request for joining a group co-editing a template shared by the mobile terminals 3 should be permitted, based on a location of the mobile terminal 3, timing at which the mobile terminal 3 makes a request (access request) for joining the group, and the template.

In the present example, the owner operates the mobile terminal 3A to set authentication conditions such as a sightseeing area extent and a sightseeing season (for example, market in Ohmi-cho, Kanazawa-city in winter) and, further, create a template using local delicacy of this sightseeing sport as a theme and register it in the shared spot server 4 as the authentication conditions. Accordingly, users who share the time, the location, and a matter of concern can join a group. In other words, the users sharing the realistic time and location can participate in an editing space in a virtual space, focusing on the theme (matter of concern) represented in the template.

It is thus possible to set multifarious authentication conditions. A more secured group can be formed by imposing severe authentication conditions, for example, setting a physically kept-out area or a shorter time zone as the authentication conditions. Conversely, by setting a larger area and a longer time zone as the authentication conditions, a group that can be joined relatively easily can also be formed. Further, by setting a template in which each group's preferences are reflected as the authentication conditions, the participants can be authenticated on the basis of their preferences.

Further, since the authentication conditions are a combination of a location, a time, and a template, the owner need not notify the participants of an ID or a password and the participants need not keep the ID or the password in mind to enter them. Depending on contents of the authentication conditions, the participants can join a group only by going to a certain location in a certain time zone and selecting a template that matches their preferences, so that more instinctive group joining authentication is possible. Further, a more real-time group can be formed.

Further, since a template represents a theme, the participant who has seen it can be expected to be more motivated in editing of the template. Moreover, since a highly real-time group can be formed as described above, the template can be expected to be edited near a venue before impression fades away.

Figure 3:
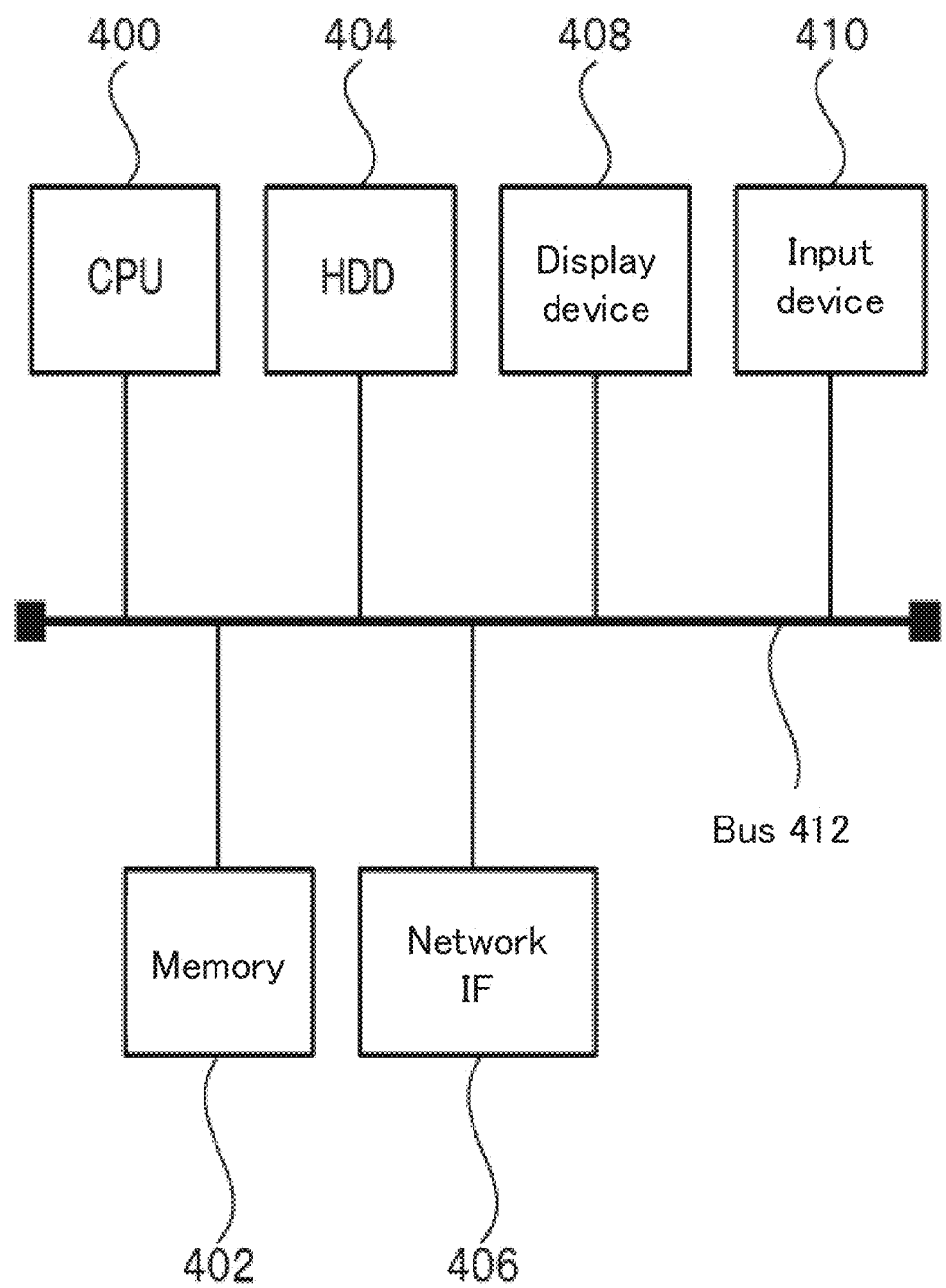
FIG. 3 is a diagram illustrating a hardware configuration of a shared spot server 4.

FIG. 3 is a diagram illustrating a hardware configuration of the shared spot server 4.

As illustrated in FIG. 3, the shared spot server 4 includes a CPU 400, a memory 402, an HDD 404, a network interface 406 (network IF 406), a display device 408, and an input device 410, which are mutually connected via a bus 412.

The CPU 400 is, for example, a central processing unit. The memory 402 is, for example, a volatile memory and functions as a main storage device.

The HDD 404 is, for example, a hard disk drive and functions as a nonvolatile storage device configured to store a computer program and other data files. The network IF 406 is an interface for wired or wireless communication and configured to establish communication with the mobile terminals 3 via the Internet.

The display device 408 is, for example, a liquid crystal display.

The input device 410 is, for example, a keyboard and a mouse.

Figure 4:
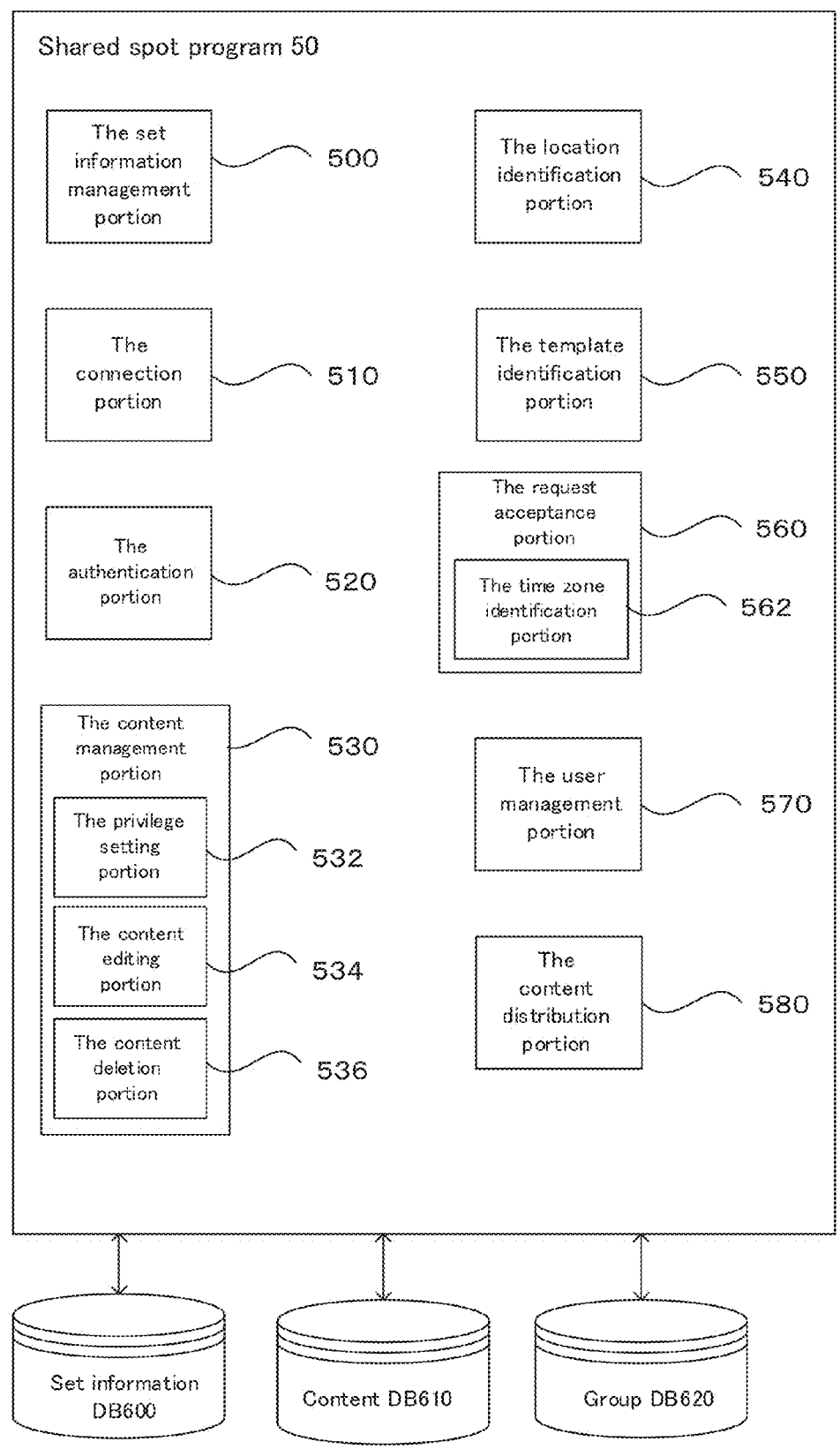
FIG. 4 is a diagram illustrating a functional configuration of the shared spot server 4.

FIG. 4 is a diagram illustrating a functional configuration of the shared spot server 4.

As illustrated in FIG. 4, the shared spot server 4 of the present example has a shared spot program 50 installed in it and includes a set information database 600 (set information DB600), a content database 610 (content DB610), and a group database 620 (group DB620).

The shared spot program 50 contains a set information management portion 500, a connection portion 510, an authentication portion 520, a content management portion 530, a location identification portion 540, a template identification portion 550, a request acceptance portion 560, a user management portion 570, and a content distribution portion 580.

The shared spot program 50 may be implemented partially or wholly by hardware such as an ASIC.

The set information management portion 500 of the shared spot program 50 registers set information received from the mobile terminal 3 into the set information DB600.

The set information management portion 500 of the present example receives set information 900 illustrated in FIG. 9 from the owner's mobile terminal 3 and registers the received set information 900 into the set information DB600. The set information 900 contains information indicating a location extent ("Location" and "Effective Radius" in the present example), a period ("Entry Time" in the present example), and information identifying a template ("Imprint Theme Sheet" in the present example), as the authentication conditions. In addition to those authentication conditions, the set information 900 may contain information "Term of Validity" indicating a group's effective period (namely, period in which data sharing is effective), information "Maximum User" indicating a group's maximum head-count, information "User Sharing" indicating enabling sharing still pictures or moving pictures, information "Allow Out of Area" indicating whether to permit reconnection of a mobile terminal once away from a shared area (location extent), information "Allow After Sharing" indicating distributing shared data after a sharing period ends, information "Auto Connecting" indicating automatically permitting a terminal detected in the shared area to join a group, and information "Require Password" indicating requesting entering a password forcedly at the time of joining a group.

If the mobile terminal 3 meets some of the authentication conditions, the connection portion 510 tries to establish network connection on this mobile terminal 3.

For example, in a case where a predetermined application program is already activated in the mobile terminal 3 and this mobile terminal 3 exists in a certain location extent, namely one of the authentication conditions, the connection portion 510 tries to establish network connection on this mobile terminal 3.

If the predetermined application program is already activated in the mobile terminal 3 and the mobile terminal 3 has entered the certain location extent, namely one of the authentication conditions, the connection portion 510 of the present example establishes connection on the predetermined application program in the mobile terminal 3 and utilizes the connection to display a template, namely another authentication condition, on the mobile terminal 3, prompting joining the group.

The authentication portion 520 decides whether to authenticate an accepted access request based on location information of the mobile terminal 3 identified by the location identification portion 540, a time zone in which the access request for contents is accepted by the request acceptance portion 560, and a template identified by the template identification portion 550.

For example, the authentication portion 520 decides whether group joining should be permitted, by comparing the location information of the mobile terminal 3 identified by the location identification portion 540, the time zone in which the access request for contents is accepted by the request acceptance portion 560, and the template identified by the template identification portion 550 to the authentication conditions registered in the set information DB600.

The content management portion 530 manages contents registered in the content DB610. The content according to the invention has a concept that covers a template itself, a content (image or character string) inserted into the template, or a combination of these.

The content management portion 530 of the present example includes a privilege setting portion 532, a content editing portion 534, and a content deletion portion 536.

The privilege setting portion 532 sets privileges on contents to a participant belonging to the same group in accordance with a distance from the owner's mobile terminal 3 to the mobile terminal 3 of the participant. For example, the privilege setting portion 532 gives the more privileges to the participant's mobile terminal 3 the nearer it is to the owner's mobile terminal 3.

The content editing portion 534 performs processing to edit a template based on editing instruction information received from the mobile terminal 3. The template editing processing means to insert an image into a template, edit or delete the inserted picture, insert a character string into the template, and edit or delete the inserted character string.

For example, the content editing portion 534 inserts an image into or deletes it from a template, edits the inserted image, or inserts a character string into or deletes it from the template.

The content deletion portion 536 deletes a content which is a portion of set information from the content DB610 if the content is stored as the portion of the set information in the set information DB600 for longer than an effective period. That is, if the effective period set for the group elapses, the content deletion portion 536 deletes the content shared in the group compatible with the set information from the content DB610. In this case, the period may be an effective period contained in the set information or a period which is one of the authentication conditions.

The location identification portion 540 identifies a location where the mobile terminal 3 exists.

For example, the location identification portion 540 acquires location information obtained via the global positioning system (GPS) from the mobile terminal 3 or information about a base station used in communication as the location information of the mobile terminal 3.

The location identification portion 540 of the present example receives the location information (GPS data) at a point in time when an access request is made by the mobile terminal 3 along with access request data from the mobile terminal 3.

The template identification portion 550 identifies a template that can be accessed by the mobile terminal 3. For example, the template identification portion 550 acquires a template ID (information configured to identify the template) owned by the mobile terminal 3.

The template identification portion 550 of the present example identifies a template selected by the mobile terminal 3 and recognizes a template ID of the identified template as authentication information.

The request acceptance portion 560 accepts a request for gaining access to content, from the mobile terminal 3. The access request is a concept that covers a template preview request, a content view request, and a content editing request.

The request acceptance portion 560 of the present example includes a time zone identification portion 562.

The time zone identification portion 562 identifies a time zone in which the access request from the mobile terminal 3 is accepted by the request acceptance portion 560.

The time zone identification portion 562 of the present example supplies the access request with time information of the point in time when the access request from the mobile terminal 3 is accepted by the request acceptance portion 560.

The user management portion 570 manages the users belonging to a group.

The user management portion 570 of the present example registers user IDs of the users who are successfully authenticated under the same authentication conditions in the group DB620 as those of the users of the group compatible with those authentication conditions. Further, the user management portion 570 registers the users (participants) who are to co-edit an album.

If a period of time set as one of the set information pieces elapses, the content distribution portion 580 distributes, to the mobile terminals 3 of the users belonging to a group compatible with this set information, contents created in the group.

If an effective period contained in the set information elapses, the content distribution portion 580 of the present example distributes contents of a group compatible with this set information to the mobile terminals 3 of all the users belonging to the group and then allows the content deletion portion 536 to delete the contents. It is possible to reduce loads on the owner by automating content distribution, and by setting time limits for content distribution and deletion, it is possible to set an editing-enabled time limit for each of the users, prompting performing real-time editing.

Figure 5:
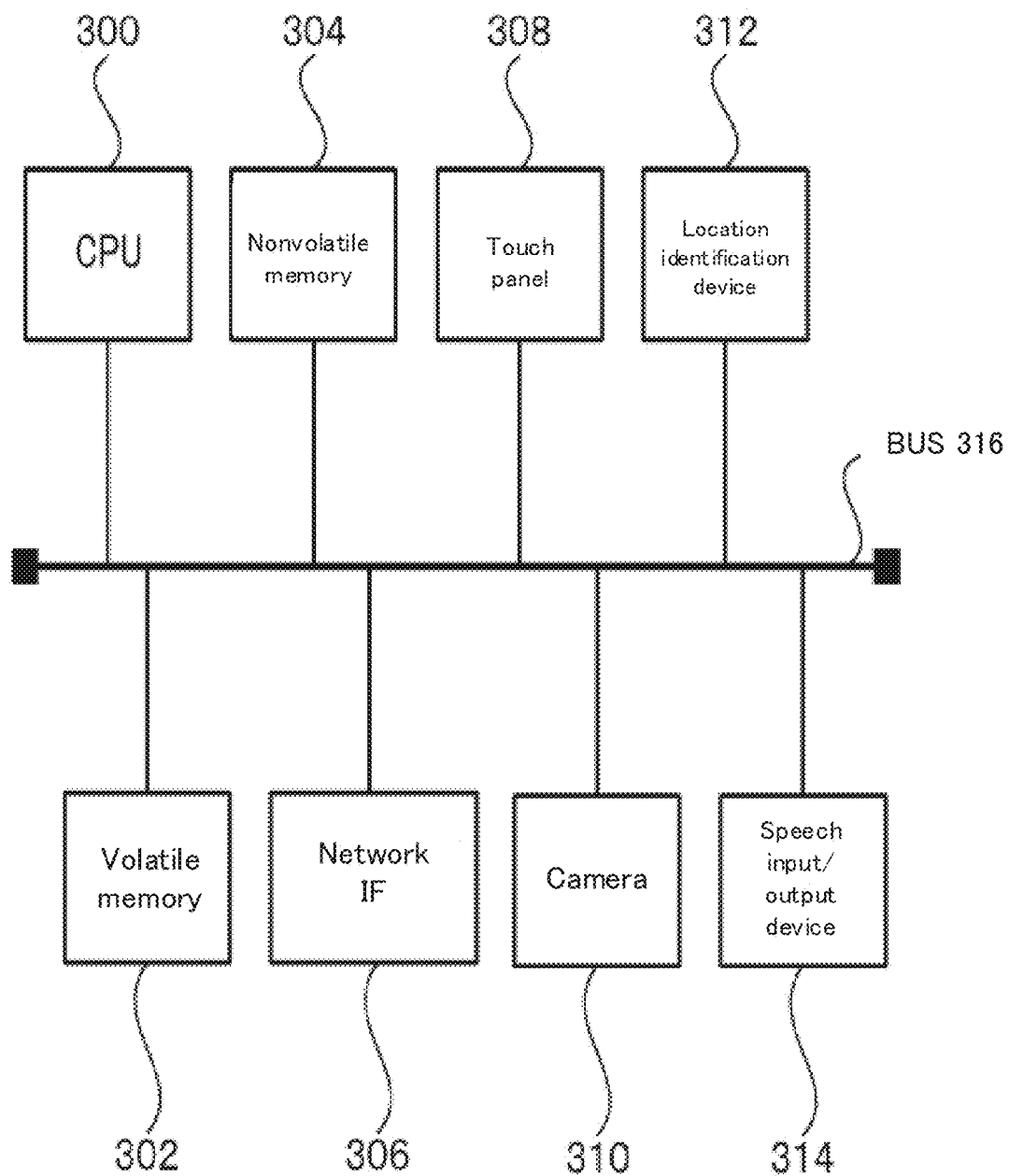
FIG. 5 is a diagram illustrating a hardware configuration of a mobile terminal 3.

FIG. 5 is a diagram illustrating a hardware configuration of the mobile terminal 3. As illustrated in FIG. 5, the mobile terminal 3 includes a CPU 300, a volatile memory 302, a nonvolatile memory 304, a network interface 306 (network IF 306), a touch panel 308, a camera 310, a location identification device 312, and a speech input/output device 314, which are mutually connected via a bus 316.

The CPU 300 is, for example, a central processing unit. The volatile memory 302 functions, for example, as a main storage device. The nonvolatile memory 304 is, for example, a storage device configured to store a computer program and other data files.

The network IF 306 is an interface for wired or wireless communication and configured to establish communication with the creation assistance server 4 via a telephone line or the Internet.

The touch panel 308 is, for example, a display configured to function as a display device and an input device.

The camera 310 is, for example, a photographing device built in the mobile terminal 3. The camera 310 may be a photographing device connected from the outside with a USB cable etc.

The location identification device 312 is configured to receive, for example, a GPS signal and identify a current location based on the received signal.

The speech input/output device 314 includes, for example, a microphone and a speaker, to input and output speeches.

Figure 6:
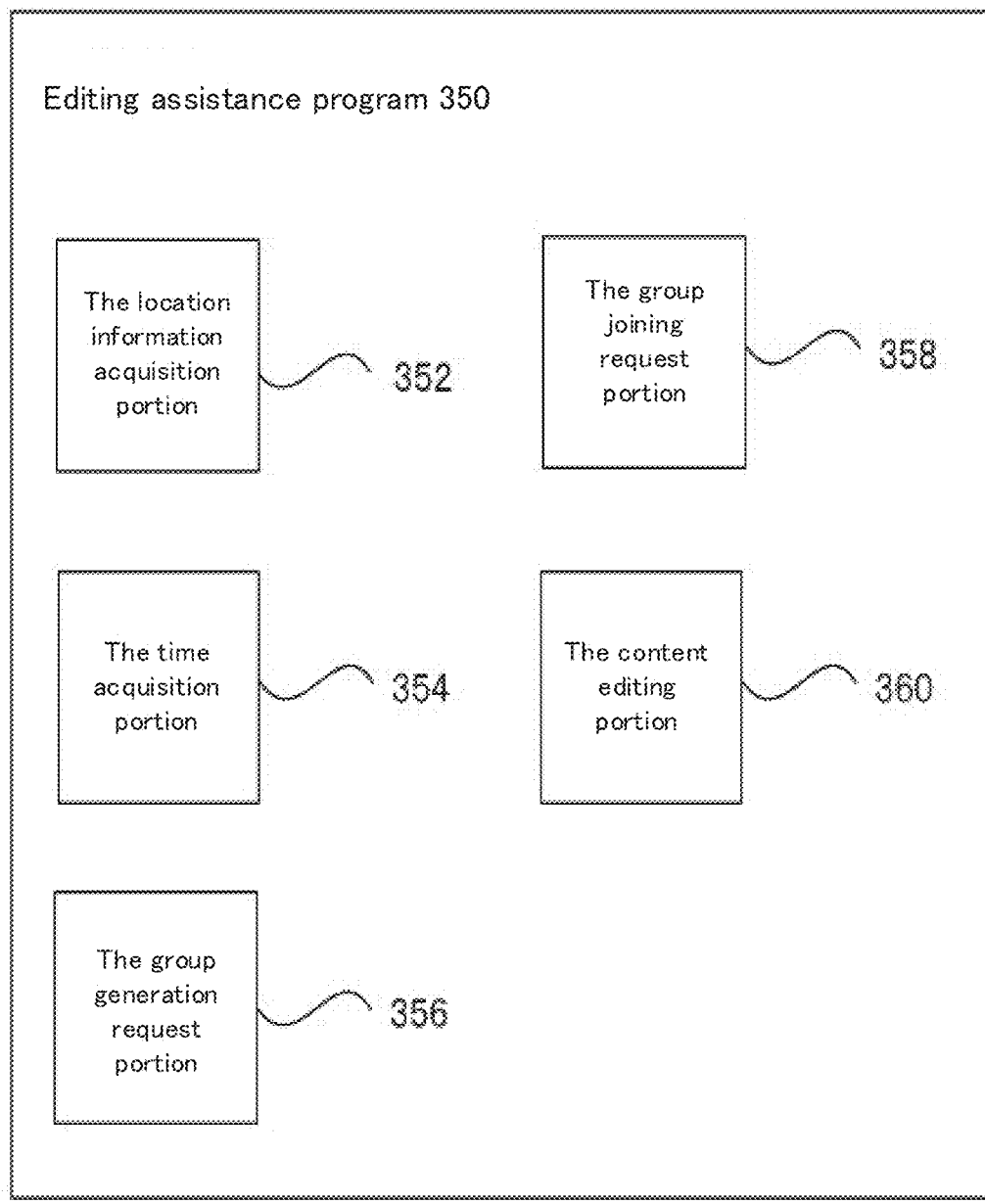
FIG. 6 is a diagram illustrating a functional configuration of the mobile terminal 3.

FIG. 6 is a diagram illustrating a functional configuration of the mobile terminal 3.

As illustrated in FIG. 6, the mobile terminal 3 has an editing assistance program 350 installed in it. The editing assistance program 350 has a location information acquisition portion 352, a time acquisition portion 354, a group generation request portion 356, a group joining request portion 358, and a content editing portion 360. The present program may be implemented partially or wholly by hardware such as an ASIC or by borrowing some functions of the operating system (OS).

In the editing assistance program 350, the location information acquisition portion 352 controls the location identification device 312 to identify a location of the mobile terminal 3 and transmits information of the identified location to the shared spot server 4.

If the mobile terminal 3 makes a request to access a content in the shared spot server 4, the location information acquisition portion 352 of the present example identifies a location at the time of requesting and transmits information of the identified location to the shared spot server 4.

The time acquisition portion 354 acquires a present time. The group generation request portion 356 requests the shared spot server 4 to register the set information 900 in response to operations of the user. That is, the group generation request portion 356 creates the set information 900 in response to the user operations and requests the shared spot server 4 to generate a group compatible with this set information 900.

The group joining request portion 358 makes a request for joining a group managed by the shared spot server 4 in response to the user operations.

The group joining request portion 358 of the present example requests the shared spot server 4 to gain access to a template (namely a group) selected by the user.

The content editing portion 360 edits a content (containing the template) managed by the shared spot server 4.

The content editing portion 360 generates editing instruction information configured to instruct editing the content in response to the user operations and transmits the generated editing instruction information to the shared spot server 4.

FIGS. 7 are tables illustrating data managed by the shared spot server 4.

As illustrated in FIG. 7A, the shared spot server 4 registers the group owner's terminal ID (mobile terminal's identification information) and the set information registered by the owner in the set information database 600 in condition where they are correlated with a group ID identifying the group and registers them. The group ID is automatically given by the set information management portion 500 at a point in time when the set information is accepted.

As illustrated in FIG. 7B, the shared spot server 4 registers contents (template, character string, picture, etc.) registered by the group owner or participant in the content database 610 in condition where they are correlated with the group ID of the group and registers them. Instead, the editing instruction information may be registered as it is in the content database 610.

As illustrated in FIG. 7C, the shares spot server 4 registers the terminal IDs (mobile terminals' identification information) of the group participants in the group database 620 in condition where they are correlated with the group ID of the group.

Next, a description will be given of operations in the shared spot system 1.

FIG. 8 is a sequence diagram illustrating an outline of the operations (S10) in the shared spot system 1.

As illustrated in FIG. 8, first the owner applies for registration of a group at the shared spot server 4 and registers the set information 900 of the group in the shared spot server 4.

If the set information 900 is not registered yet, the shared spot server 4 turns down a request for joining the group. If having allowed registration of the group's set information 900, the shared spot server 4 randomly generates a group ID configured to identify the group and distributes the generated group ID to the owner.

After generating the group ID, the shared spot server 4 starts accepting joining the group and performs the later-described group generation processing (S20) to authenticate the request for joining the group, adding group participants.

After a period (Entry time) set as one of the authentication conditions ends, the group joining request is turned down.

Next, the shared spot server 4 accepts processing to edit a template, which is one of the authentication conditions. The participant transmits picture data, moving picture data, or the editing instruction information to the shared spot server 4, to request it to edit the template. The shared sport server 4 edits the template in accordance with the participant's editing instruction information etc., and transmits the edited template to the owner. The edited template etc. may be collected in the owner's mobile terminal 3 or the shared spot server 4.

If the editing-enabled period (Term of validity) ends, the shared spot server 4 distributes the template (namely a content) edited in the group to the group participants and dissolves the group.

Figure 10:
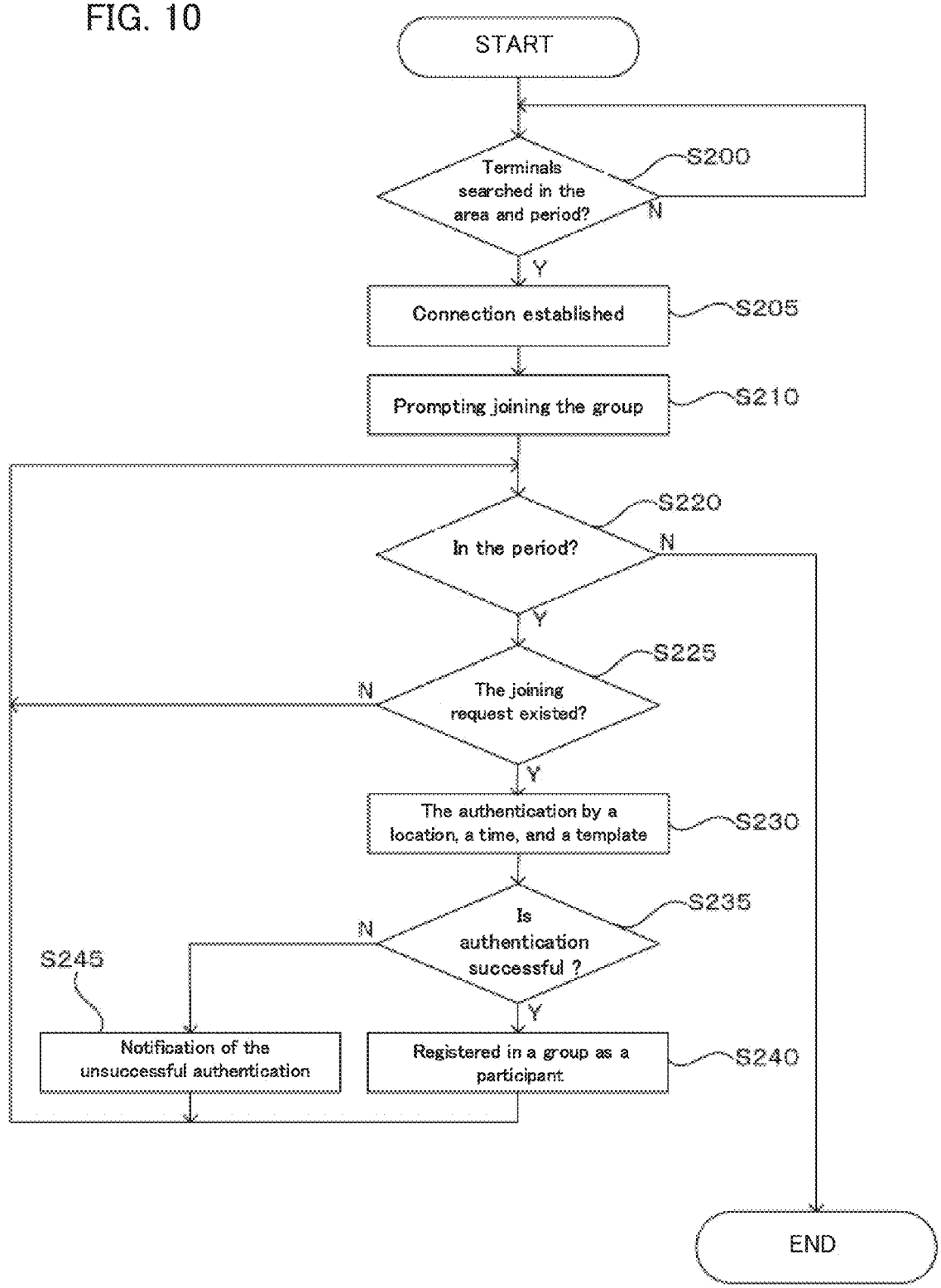
FIG. 10 is a flowchart of group generation processing (S20) by the shared spot server 4.

FIG. 10 is a flowchart of the group generation processing (S20) by the shared spot server 4. The flowchart will be described based on the assumption that the set information 900 is registered in the set information DB 600 already and the editing assistance program 350 is activated in the mobile terminal 3.

As illustrated in FIG. 10, in step 200 (S200), if a period (Entry time) registered in the set information DB 600 is entered, the location identification portion 540 of the shared spot server 4 identifies current locations of the mobile terminals 3 and searches for any of the mobile terminals 3 that enters a location extent (area), which is one of the authentication conditions in the set information 900.

The shared spot server 4 waits until any of the mobile terminals 3 is found in the authentication conditional area (NO in S200) and, if the mobile terminal 3 is newly found in the area, shifts to processing in S205 (YES in S200).

In step 205 (S205), if the mobile terminal 3 is found in the area by the location identification portion 540 within the authentication conditional period, the connection portion 510 tries to establish connection to the editing assistance program 350 in this mobile terminal 3. If the connection is established, as illustrated in FIG. 17 (A), the mobile terminal 3 is notified to the effect that it has entered the shared area (shared spot).

In step 210 (S210), if connection is established with the editing assistance program 350 in the mobile terminal 3, the connection portion 510 displays a list of the templates registered in the set information DB 600 on the mobile terminal 3 via the connection as illustrated in FIG. 17 (C), prompting joining the group.

In step 220 (S220), the shared spot server 4 shifts to processing in S225 if it is within the authentication conditional period and ends the group generation processing (S20) if it is out of the authentication conditional period.

In step 225 (S225), the request acceptance portion 560 waits until the mobile terminal 3 makes a request for joining the group (NO in S225) as monitoring whether it is within the authentication conditional period by using the time zone identification portion 562 and, if having received the group joining request from the mobile terminal 3, shifts to processing in S230 (YES in S225). The group joining request contains a template ID of the template selected by the user and GPS data received by the mobile terminal 3.

In step 230 (S230), the template identification portion 550 provides the authentication portion 520 with the template ID contained in the group joining request.

The request acceptance portion 560 provides the authentication portion 520 with a time at which the group joining request is accepted and which is identified by the time zone identification portion 562.

The location identification portion 540 identifies a location of the mobile terminal 3 based on the GPS data contained in the group joining request and outputs information of the identified location to the authentication portion 520.

The authentication portion 520 compares the template ID input by the template identification portion 550, the acceptance time input from the request acceptance portion 560, and the location information of the mobile terminal 3 input from the location identification portion 540 to the authentication conditions (location extent, period, and template ID) registered in the set information DB 600.

In step 235 (S235), if the mobile terminal 3's location and the acceptance time meet the authentication conditional location extent and period respectively and the template IDs agree, the authentication portion 520 allows the mobile terminal 3 to join the group and, otherwise, prohibits it from joining the group.

The shared spot server 4 shifts to processing in S240 if group joining is allowed (that is, authentication is successful) and shifts to processing in S245 if group joining is prohibited (that is, authentication is unsuccessful).

In step 240 (S240), as illustrated in FIG. 7C, the user management portion 570 registers the terminal IDs of the mobile terminals 3 allowed to join the group by the authentication portion 520 in the group database 620 in condition where they are correlated with the group ID of this group (which is compatible with the authentication conditions).

In step 245 (S245), the user management portion 570 transmits unsuccessful authentication to the mobile terminal 3. Information of the unsuccessful authentication may contain a message configured to prompt entering the area.

In such a manner, the shared spot server 4 automatically establishes connection with the mobile terminal 3 that meets the authentication conditional location extent and period such that it may be prompted to join a group and authentication group joining based on a user-selected template ID, a group joining request acceptance time, and a mobile terminal 3's current location.

Although it has been preset in the present example that the mobile terminal 3 would automatically join the group if it has entered the shared area as illustrated in FIG. 17(D), it may be preset that automatic joining would be rejected.

Figure 11:
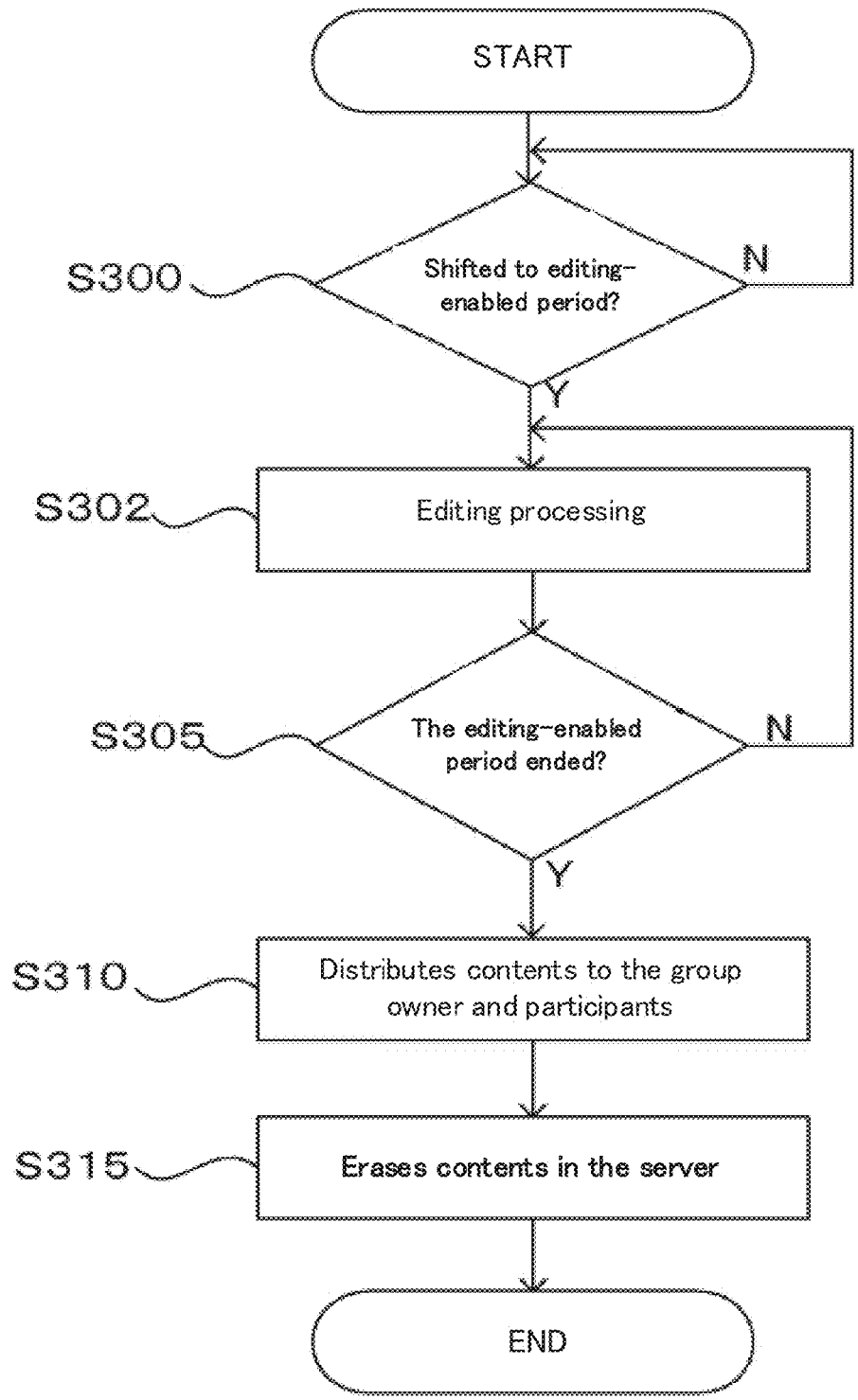
FIG. 11 is a flowchart of content editing/distribution processing (S30) by a creation assistance server 4.

FIG. 11 is a flowchart of content editing/distribution processing (S30) by the creation assistance server 4.

As illustrated in FIG. 11, in step 300 (S300), the content management portion 530 waits until an editing-enabled period is entered (NO in S300) and, if the editing-enabled period is entered, shifts to editing processing (S302) (YES in S300).

In step 302 (S305), the content editing portion 534 performs processing to edit a template in response to an editing instruction from the owner or the participant. The editing processing involves replacement, deletion, and rearrangement of pictures besides the addition of the pictures to the template. The editing processing can be performed in units of a page or content data piece.

In step 305 (S305), the content management portion 530 performs the editing processing (S303) until the editing-enabled period ends (NO in S305) and, if the editing-enabled period ends, shifts to content distribution processing (S310) (YES in S305).

In step 310 (S310), the content distribution portion 580 distributes contents edited in the group to the mobile terminals 3 of the group owner and participants.

In step 315 (S315), the content deletion portion 536 erases all the contents shared in the group from the content database 610 on the condition that the editing-enabled period is over and distribution of the contents is finished.

In such a manner, the shared spot server 4 allows editing contents shared in a group only in the editing-enabled period and, after the editing-enabled period ends, erases the contents shared in the group from the storage if they are distributed to the participants. The information is thus prevented from leaking, to enable the participants to join the group with security.

As described above, by the shared spot system 1 of the present embodiment, it is possible to authenticate joining a group based on a location of the mobile terminal, a time zone in which an access request is made, and a template to be accessed. Accordingly, the group is formed by the participants having the time, the location, and a matter of concern in common, to enable expecting active co-editing.

Next, a description will be given of a second embodiment.

The second embodiment is different from the first embodiment in that a template edited by a user is configured to be registered as one of authentication conditions, a sub-group is configured to be formed depending on a degree of similarity in authentication conditions, and access restrictions are imposed on the template itself to enable forming a group composed of only specific users.

Figure 12:
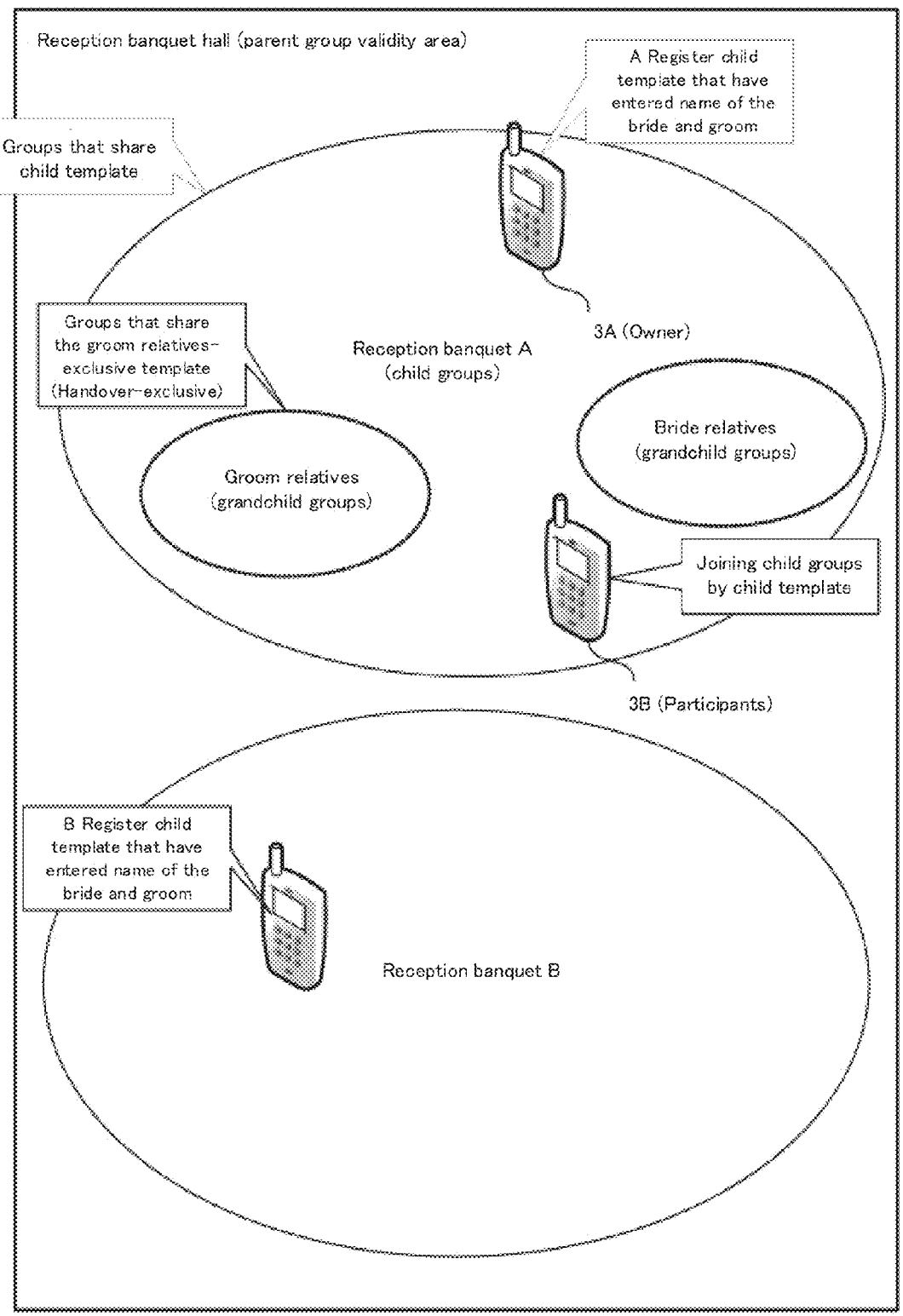
FIG. 12 is an explanatory view of group joining conditions (authentication conditions) in a second embodiment.

FIG. 12 is an explanatory view of group joining conditions (authentication conditions) in the second embodiment.

As illustrated in FIG. 12, in a shared spot system 1 of the present example, in a scene in which a parent group is formed by using a specific area (reception banquet hall), a period (period of reception banquet), and a template (parent template prepared by the reception banquet hall) as the authentication conditions, by editing the parent template and registering it as one of the authentication conditions in a shared spot server 4, sub-groups (child groups) sharing the edited template (child template) are formed.

Moreover, when participants edit the child template and register it as one of the authentication conditions in the shared spot server 4, sub-groups (grandchild groups) sharing the edited template (grandchild template) are formed.

Moreover, in the present embodiment, by making the template a handover-exclusive one (that is, by imposing access restrictions on a route to access the template), it is possible to form a group composed of only specific users (users to whom the template is delivered).

Further, by setting a password to the template (that is, by imposing access restrictions on a data file itself of the template), a group composed of only specific users (users notified of the password) may be formed.

Figure 13:
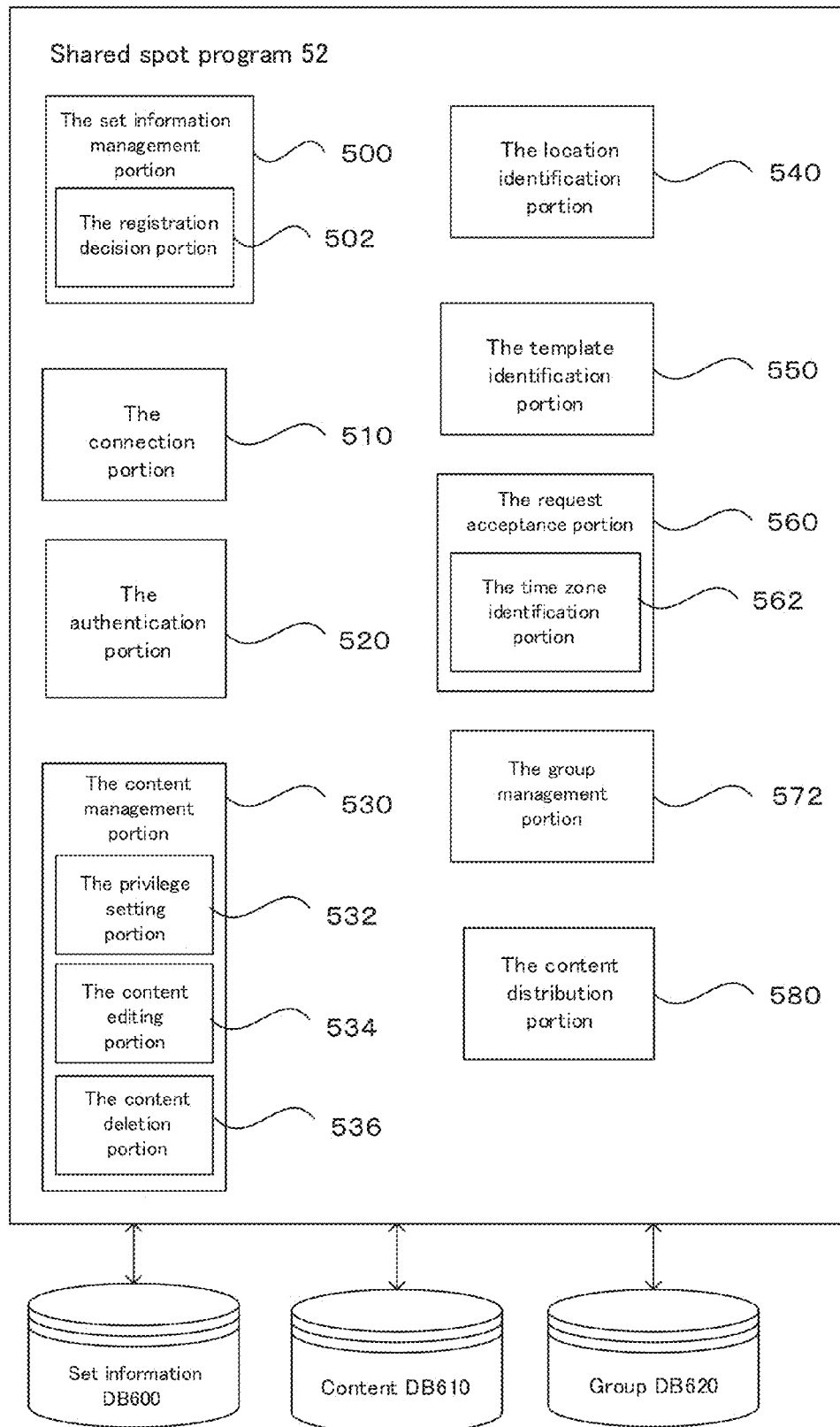
FIG. 13 is a diagram illustrating a functional configuration of the shared spot server 4 in the second embodiment.

FIG. 13 is a diagram illustrating a functional configuration of the shared spot server 4 in the second embodiment. The same reference numerals are given to components in the figure which are essentially the same as those shown in FIG. 4.

As illustrated in FIG. 13, a shared spot program 52 of the present embodiment has a configuration in which a registration decision portion 502 is added to the shared spot program 50 in FIG. 4 and the user management portion 570 in it is replaced by a group management portion 572.

In the shared spot program 52, the registration decision portion 502 compares an authentication condition whose registration is newly requested to the authentication condition registered in a set information DB600 and, based on results of the comparison, decides whether to register the newly registration-requested authentication condition in the set information DB600.

For example, if the newly registration-requested authentication condition is similar to the authentication condition already registered in the set information DB600 by at least a specified value, the registration decision portion 502 prohibits registration of the newly registration-requested authentication condition. In a case where a plurality of authentication conditions have similarities (that is, there are a plurality of groups over which a time, a location, and a matter of concern (template) have similarities), not only it is troublesome for the participants but also group members may possibly be diluted to deactivate co-editing, so that prohibition of redundant registration contributes to sustaining of group activity.

Further, if the newly registration-requested authentication condition is similar to any one of the authentication conditions already registered in the set information DB600 by at least the specified value, the registration decision portion 502 may register the newly registration-requested authentication condition in the set information DB600 as an authentication condition of a sub-group of a group compatible with this already registered authentication condition. It is thus possible to form sub-groups easily.

In accordance with degree of similarity decision conditions illustrated in FIG. 14A, if the newly registration-requested authentication condition closely resembles any one of the authentication conditions already registered in the set information DB600, the registration decision portion 502 of the present example prohibits the newly registration-requested authentication condition from being newly registered and, if the newly registration-requested authentication condition does not closely resemble but is similar to any one of the authentication conditions already registered in the set information DB600, newly registers the newly registration-requested authentication condition as set information of the sub-group of an already registered group.

Further, in a case where a request for registration of an authentication condition (set information 900) is received from a mobile terminal 3, only if the mobile terminal 3 exists in an area contained in the authentication condition, the registration decision portion 502 of the present example allows registration of the registration-requested authentication condition (set information 900). That is, the user can start up a group only in an area he has set by himself. Accordingly, an owner of a group needs to actually go to the area by himself, so that it can be expected to form the sympathetic group (template) in condition where he would share a venue with participants. It can be expected also to prevent groups from shooting up.

As illustrated in FIG. 14B, the group management portion 572 registers the participants of a sub-group in a group DB620 in condition where they are correlated with a group ID of the sub-group and a group ID of a parent group of the sub-group. it is thus possible to join a layered group.

Figure 15:
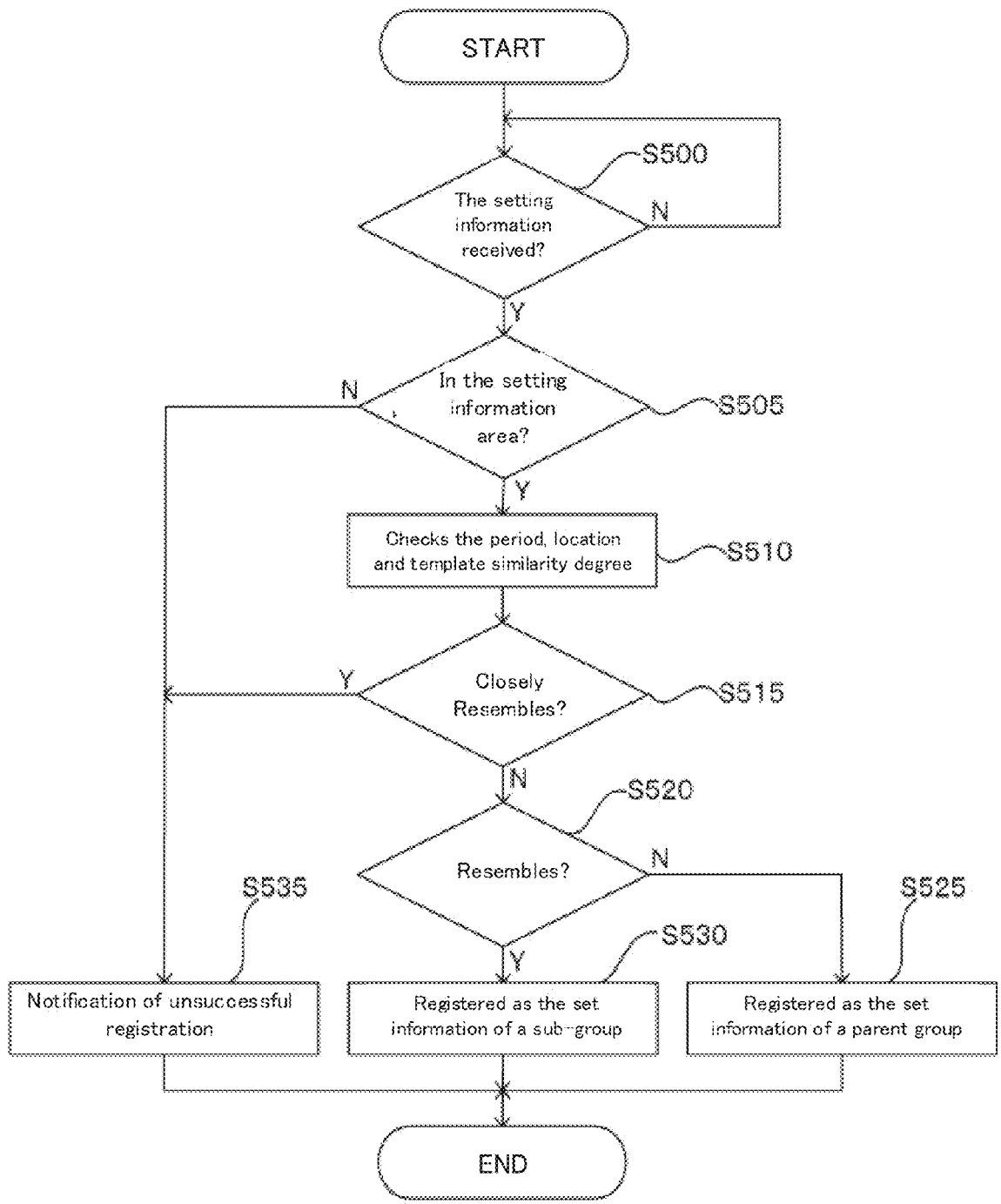
FIG. 15 is a flowchart of set information registration processing (S50) in the second embodiment.

FIG. 15 is a flowchart of set information registration processing (S50) in the second embodiment.

As illustrated in FIG. 15, in step 500 (S500), a set information management portion 500 waits until the set information 900 is received from the mobile terminal 3 (NO in S500) and, if having received the set information 900, shifts to processing in S505.

In step 505 (S505), the registration decision portion 502 compares a location extent contained in the received set information 900 to location information of this mobile terminal 3 identified by a location identification portion 540 and, if the mobile terminal 3 that requested registration of the set information 900 exists in an area preset in the set information 900, allows registration of the set information 900 and, if the mobile terminal 3 that requested registration does not exist in the preset area, prohibits registration of the set information 900.

If the registration is allowed by the registration decision portion 502, the shared spot server 4 shifts to processing in S510 and, if the registration is prohibited, shifts to processing in S535.

In step 510 (S510), the registration decision portion 502 compares the authentication conditions (location extent, period, and template) received from the mobile terminal 3 to the already registered authentication conditions and checks them against the degree of similarity decision conditions in FIG. 14A.

In step 515 (S515), if the location extent and the period contained in the authentication conditions received from the mobile terminal 3 are respectively the same as the location extent and the period in the already registered authentication conditions and the template contained in the received authentication conditions agrees with the template in the already registered authentication conditions by at least 95%, the registration decision portion 502 decides that they closely resemble and prohibits new registration and, otherwise, decides that they do not closely resemble and allow new registration.

If new registration is prohibited by the registration decision portion 502, the shared spot server 4 shifts to processing in 5535 and, if new registration is allowed by the registration decision portion 502, shifts to processing in S520.

In step 520 (S520), if the location extent and the period contained in the authentication conditions received from the mobile terminal 3 are respectively within the location extent and the period in the already registered authentication conditions and the template contained in the received authentication conditions agrees with the template in the already registered authentication conditions by at least 90%, the registration decision portion 502 decides that they closely resemble and prohibits new registration and, otherwise, decides that they do not closely resemble and allow new registration. If having decided that they are similar, the registration decision portion 502 notifies to the effect that the similar group is already registered to prompt confirming it as illustrated in FIG. 17(E).

If it is decided by the registration decision portion 502 that they are similar, the shared spot server 4 shifts to processing in S530 and, if it is decided by the registration decision portion 502 that they are not similar, shifts to processing in S525.

In step 525 (S525), in response to an instruction from the registration decision portion 502, the set information management portion 500 registers the authentication conditions received from the mobile terminal 3 in the set information DB600 as set information of an ordinary group (parent group).

In step 530 (S530), in response to an instruction from the registration decision portion 502, the set information management portion 500 registers the authentication conditions received from the mobile terminal 3 in the set information DB600 as set information of a sub-group of an already registered similar group.

In step 535 (S535), the set information management portion 500 notifies the mobile terminal 3 of unsuccessful registration of the group's set information (authentication conditions).

As described above, by the shared spot system 1 of the second embodiment, it is possible to prevent formation of groups whose authentication conditions (namely, matter of concern, location, and period) resemble closely. Further, mutually similar groups can be managed in condition where they are layered. The user can newly set a group easily because he can create sub-groups by editing a portion of the template of a parent group and borrowing the other set information pieces (period, location, etc.) as illustrated in FIG. 16.

Further, by imposing access restrictions on the template, it is possible to form a group composed of specific members.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
an authentication information storage that stores location information, a time period, and content identification information as authentication information;
a location identification portion that identifies location information where a mobile terminal exists;
a template identification portion that identifies a content configured to be accessed by the mobile terminal;
a connection portion that, if a predetermined application program is already activated in the mobile terminal and authentication information stored in the authentication information storage is compared with and at least partially satisfied, attempts to establish network connection with the mobile terminal;
a request acceptance portion that accepts a content access request from the mobile terminal; and
an authentication portion that determines whether to allow the accepted content access request based on the identified location information, the identified content, and a time zone in which the access request from the mobile terminal is accepted, wherein:
the connection portion displays a list of contents which are identified by the template identification portion to the mobile terminal, and
the authentication portion determines whether to allow the content access request to one of the contents in the list displayed by the connection portion, using the authentication information stored in the authentication information storage.

2. The information processing device according to claim 1, further comprising:
a content storage that stores a content created using the content in condition where the content can be accessed by the mobile terminal which is made accessible by the authentication portion; and
a content deletion portion that, if the time period stored in the authentication information storage elapses, deletes the content created using the content compatible with the content identification information, which is one of the authentication information from the content storage.

3. The information processing device according to claim 2, further comprising:
a registration decision portion that compares new authentication information whose registration is newly requested and the authentication information stored in the authentication information storage and, based on results of the comparison, determines whether to register the new authentication information in the authentication information storage.

4. The information processing device according to claim 3, further comprising:
a group management portion that manages, as a group, identification information of a plurality of users who make a content access request by using the same authentication information, wherein:
if the new authentication information is similar to any one of the authentication information stored in the authentication information storage by at least specified conditions, the registration decision portion allows registering the new authentication information as a sub-group of the group compatible with similar authentication information, and
the group management portion manages authentication information of the sub-group in condition where it is correlated with a relevant group.

5. The information processing device according to claim 4, wherein if an authentication information registration request is made newly by a mobile terminal, the registration decision stores the new authentication information in the authentication information storage on condition that the requesting mobile terminal exists in location information contained in the new authentication information.

6. The information processing device according to claim 1, further comprising:
a privilege setting portion that sets to the mobile terminal belonging to a same group as the other mobile terminal whose authentication information is registered a privilege on the content created in the group in accordance with a distance between the mobile terminal and the other mobile terminal in the same group.

7. The information processing device according to claim 6, further comprising:
a content distribution portion that, if the time period stored in the authentication information storage elapses, distributes the content created in the group to the mobile terminal belonging to the group compatible with the authentication information.

8. A non-transitory computer-readable medium storing thereon a computer program, wherein the computer program, when executed by a computer, causes the computer to execute:
storing, in an authentication information storage, location information, a time period, and content identification information as authentication information;
identifying location information where a mobile terminal exists;
identifying a content configured to be accessed by the mobile terminal;
attempting, if a predetermined application program is already activated in the mobile terminal and authentication information stored in the authentication information storage is compared with and at least partially satisfied, to establish network connection with the mobile terminal;
accepting a content access request from the mobile terminal;
determining whether to allow the accepted content access request based on the identified location information, the identified content, and a time zone in which the content access request from the mobile terminal is accepted;
displaying a list of contents which are identified to the mobile terminal; and
determining whether to allow the content access request to one of the contents in the list displayed, using the authentication information stored in the authentication information storage.

9. An information processing system comprising:
a mobile terminal: and
an information processing device, wherein:
the information processing device comprises:
an authentication information storage that stores location information, a time period, and content identification information as authentication information;
a location identification portion that identifies location information where a mobile terminal exists;
a template identification portion that identifies a content configured to be accessed by the mobile terminal;
a connection portion that, if a predetermined application program is already activated in the mobile terminal and authentication information stored in the authentication information storage is compared with an at least partially satisfied, attempts to establish network connection with the mobile terminal;
a request acceptance portion that accepts a content access request from the mobile terminal; and
an authentication portion that determines whether to allow the accepted content access request based on the identified location information, the identified content, and a time zone in which the content access request from the mobile terminal is accepted, wherein:
the mobile terminal edits contents by using the content,
the connection portion displays a list of contents which are identified by the template identification portion to the mobile terminal, and
the authentication portion determines whether to allow the content access request to one of the contents in the list displayed by the connection portion, using the authentication information stored in the authentication information storage.

10. The information processing device according to claim 1, wherein:
the information processing device comprises processing circuitry and a non-transitory memory storing a computer program, and
the computer program, when executed by the processing circuitry, causes the processing circuitry to function as the location identification portion, the template identification portion, the connection portion, the request portion, and the authentication portion.

11. The information processing system according to claim 9, wherein:
the information processing device comprises processing circuitry and a non-transitory memory storing a computer program, and
the computer program, when executed by the processing circuitry, causes the processing circuitry to function as the location identification portion, the template identification portion, the connection portion, the request portion, and the authentication portion.

* * * * *